READING MACHINE SYSTEM WITH TAPE OUTPUT

Filed Feb. 23, 1962 2 Sheets-Sheet 1

INVENTOR.
Norman Hardy
BY Joseph A. Genovese & Max L. Libman
ATTORNEYS

READING MACHINE SYSTEM WITH TAPE OUTPUT

Filed Feb. 23, 1962 2 Sheets-Sheet 2

INVENTOR.
Norman Hardy
BY Joseph A. Genovese &
Max L. Libman
ATTORNEYS

3,226,529

READING MACHINE SYSTEM WITH TAPE OUTPUT

Norman Hardy, Bethesda, Md., assignor, by mesne assignments, to Control Data Corporation, Minneapolis, Minn., a corporation of Minnesota Filed Feb. 23, 1962, Ser. No. 175,098
10 Claims. (Cl. 235—61.11)

Figure 1:
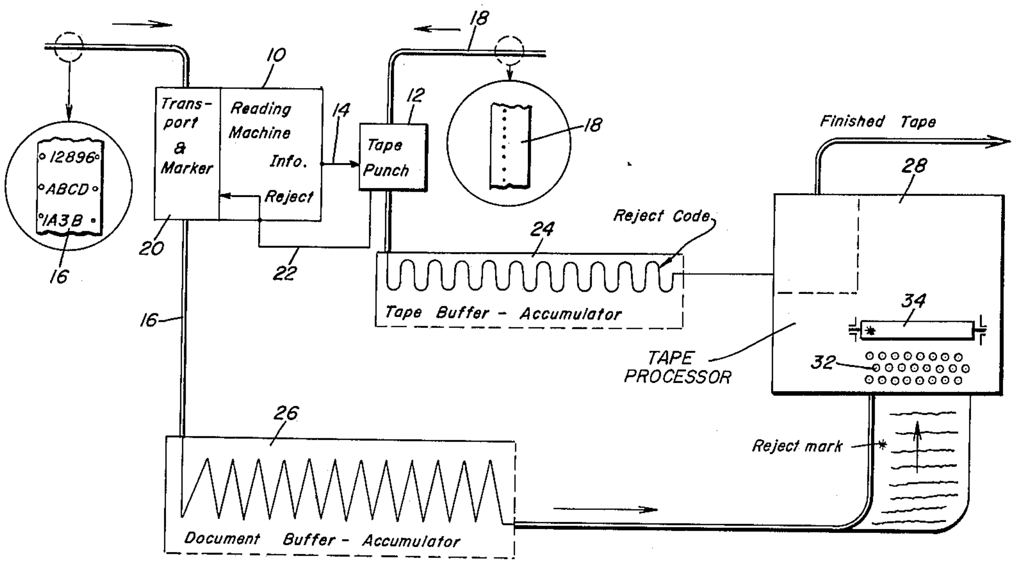

This invention relates to reading machine systems, and particularly to procedures for preparing a record of the output of a reading machine.

Optical reading machines are inherently faster than previous methods of converting data into "computer language," i.e. a form suitable for feeding into a calculator, computer or the like. When an optical reading machine reads a document, the output of the machine is ordinarily in the form of electrical signals identifying each character. These signals can be fed directly into the computer although there are some timing problems unless the machine is specifically designed to be used with a given computer. The more general application of these electrical signals is to form a record, and the record is then fed to the computer. Conventional records are punched cards, magnetic tapes and punched paper tape. While my present invention is particularly concerned with improved procedures for forming punched paper tape records which are then used in other equipment of a data processing system, for example a calculator or computer, it can be applied with suitable changes to magnetic tape, as well.

Occasionally, in the normal operation of a reading machine, the machine will fail to identify a character because the character is ambiguous or for other reasons. Thus, the reading machine will reject the character and provide a reject signal indicating that a character has not been identified. When this happens there are several things that can be done in forming the punched tape. The reject signal can be used to stop the reading machine, and the unread character can be manually punched or otherwise inserted into the tape if it is readable by human beings. This is not satisfactory if it occurs frequently because it is not easy to stop and start a reading machine and furthermore, "down" time of a reading machine very seriously impairs its efficiency. The second thing that can be done is to temporarily ignore the reject signal and edit the punched paper tape upon completion of a run of documents. This is an unsatisfactory solution to the problem because the only known methods of editing punched paper tapes are to merge tapes or cut and splice them. The Rabinow Patent No. 3,181,119 provides a general solution to the problem where a word, line, etc. of a document containing a rejected character, is displayed to enable an operator to fill in the rejected character. My invention provides an analogous, but different solution to the same problem.

In my system I provide a buffer-accumulator for the punched paper tape as it leaves the reading machine-controlled tape punch. When there is a reject, the document being read is marked in the appropriate place and a reject code is punched in the tape. Then, the punched paper tape and the document are concurrently fed into a commercially available tape processor such as a "Flexowriter" or the equivalent type of machine capable of recognizing a reject code and providing a facility for a human operator to manually punch code information into the tape. Accordingly, when the visual reject mark on the document is observed by the machine operator the reject code on the tape corresponding to the visual reject mark reaches the punch of the processor, enabling the operator to fill in the character or characters which are not represented in the tape.

An important feature of my invention is that the tape accumulator allows any practical amount of tape to be temporarily stored between the reading machine-controlled punch and the punched paper tape reader of the operator-controlled machine. Thus, I can and preferably do provide means to advance a predetermined additional amount of unpunched tape through the reading machine-controlled punch transport into the tape buffer accumulator. This additional unpunched tape enables the operator of the tape processor to correct any mistakes that the operator may make, or to provide computer instructions on the tape.

A further object of my invention is to provide a system for preparing punched paper tapes by means of a punch which is operated in accordance with optical reading machine outputs, and where the reading machine is not stopped when one or more characters are rejected. Yet, there is ample time for the rejected character or characters to be manually inserted in the tape before the tape is completed for further use in a data processing system.

Other objects and features of importance will become apparent in following the description of the illustrated form of my invention.

FIGURE 1 is a diagrammatic view showing my system.

Figures 1A, 1B, 1C:
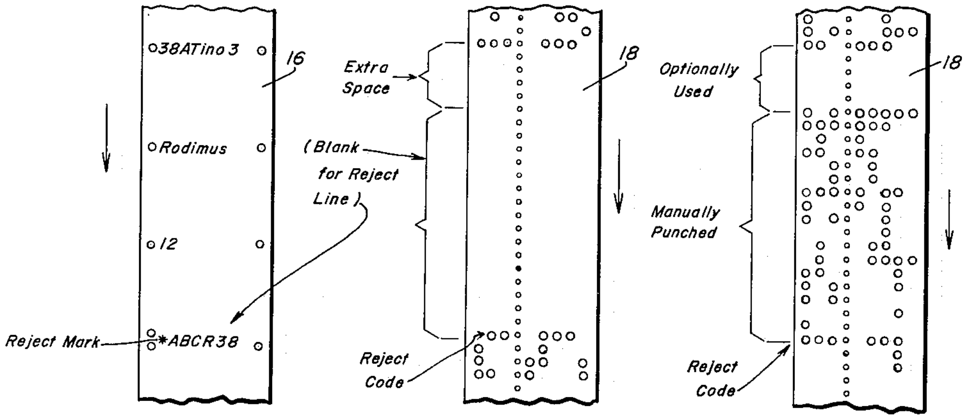

FIGURES 1*a*–1*c* are diagrammatic views showing parts of a typical tape and document.

Figure 2:
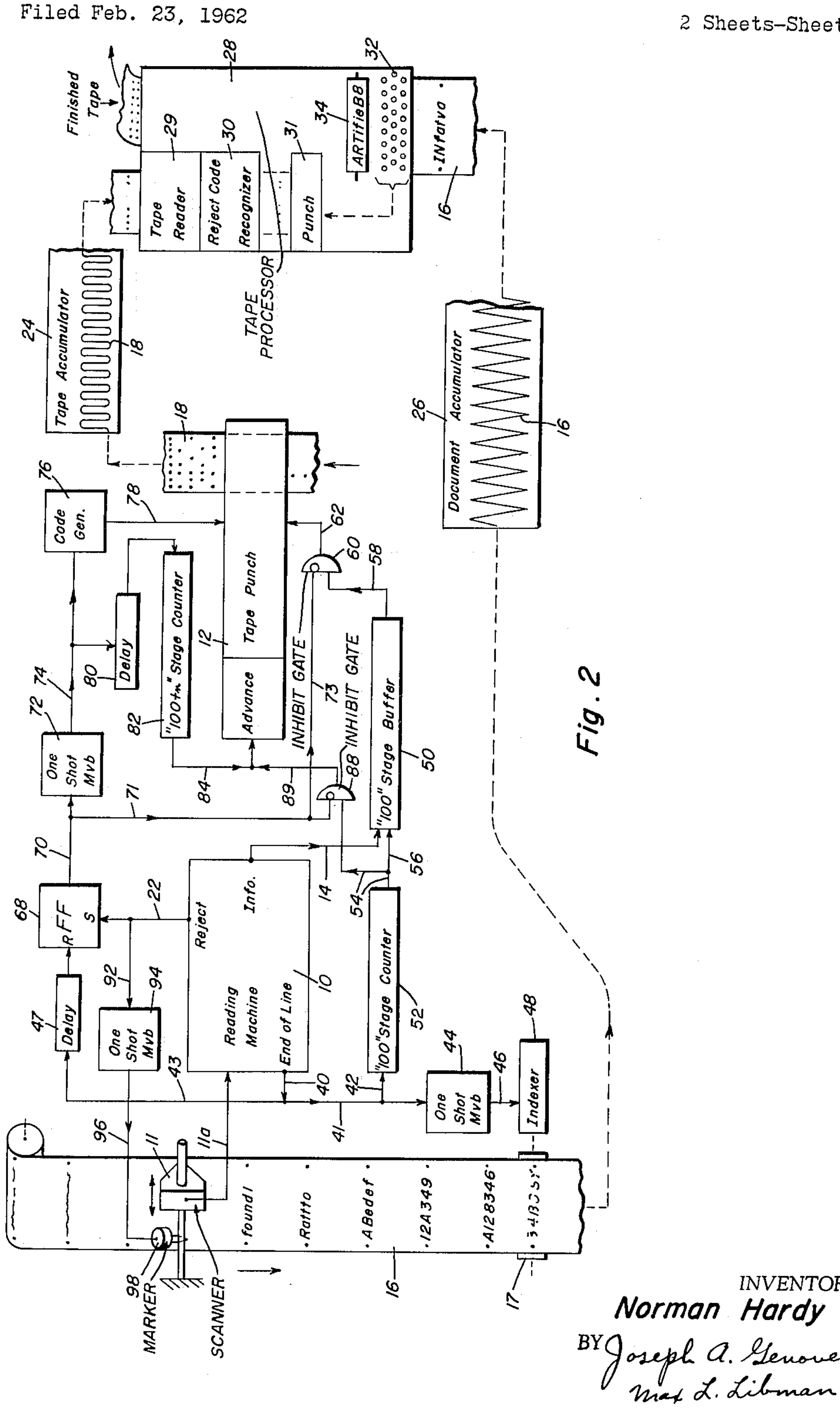

FIGURE 2 is a diagrammatic view showing the details of the system in FIGURE 1.

*Summary of system*

In the accompanying drawings attention is directed first to FIGURES 1–1*c*. Reading machine 10 is assumed to be a conventional optical reading machine whose outputs are fed to the paper tape punch 12 over the conductors of cable 14. Thus, as the lines of characters (see inset at left side of FIGURE 1 and see FIGURE 1*a*) on document 16 are identified, corresponding codes are transmitted to the punch 12 so that the punch forms a paper tape 18, i.e. punches codes in the raw tape, which correspond to the identified characters. Reading machine 10 has means 20 to form a visual mark (called "reject mark" in FIGURES 1 and 1*a*) in the document when the reading machine rejects a character. The reject marker operates by a signal which is also conducted on line 22 to the paper tape punch 12 to punch a reject code in the tape (FIGURES 1*b* and 1*c*), and also to advance the tape (without punching) a distance sufficient to leave a blank space (FIGURE 1*b*) for subsequent manual insertion of at least the rejected character (FIGURE 1*c*). When the characters are in lines (FIGURE 1*a*), I may leave enough blank space on tape 18 to punch in the entire line. How this is done is described later (FIGURE 2). It has been found useful not only to leave enough space for the line of characters, but also to furnish additional space (FIGURES 1*b* and 1*c*) for other purposes.

When the tape is formed by punch 12, with or without rejects and with the above mentioned reject spaces (FIGURE 1*b*), it is fed into a tape buffer-accumulator 24 which stores the tape in serpentine fashion, or in one or more loops, or in other ways. Document 16 is shown as a pin-fed strip and therefore the document buffer-accumulator 26 may store the document in fan-fold fashion although other accumulation methods can be used. The paper tape and document are fed from their respective accumulators 24 and 26 into a conventional, manually controlled tape processing device 28 which has various facilities. A commercially available "Flexowriter" processor will fully serve my purpose. Such machines are usually equipped with a punch paper tape reader 29 (FIGURE 2), a reject code recognizer 30, a punch 31, a keyboard 32, and a platen 34. In one of the modes of operation of device 28, punched paper tape is fed into its reader 29 until a reject code is detected by the code recognizer 30. At that time the tape feed for the reader 29 is stopped. Concurrently with punched paper tape reading by reader 29, the "hard copy" (document 16 herein) is fed over the platen 34, and when the paper tape feeder stops, the document-feed is also stopped by any suitable means, e.g. manually or by a mark-senser positioned near the document 1. At this time the reject mark can be visually observed adjacent to the line of characters containing the reject (or near the rejected character itself) and the human operator can observe this line and operate the keys of keyboard 32 causing the punch of machine 28 to punch in the corect data in tape 18, i.e. the characters of the line on document 18 which is marked. Then the operator of device 28 starts the document feeder 34 until the next reject mark is noted.

While the immediately preceding operation is taking place, the reading machine 10 is not stopped. Buffer accumulators 24 and 26 are of sufficient capacity to allow the tape and document to accumulate during this time. Accordingly, my system enables a correct punch paper tape to be prepared including codes for those characters which are rejected by a reading machine, without having to discontinue operation of the reading machine.

FIGURE 2 shows the details of a specific form of the general system shown in FIGURE 1. In addition to cable 14 which conducts the character-identifying outputs of the reading machine 10, line 40 conducts a signal indicating the end of a line of characters on document 16. It is convenient to use the "end of line" signal (e.g. as in Patent No. 3,069,494) to index the document transport 17 in a system using a transversely movable scan head 11 as shown in the same patent. Accordingly, the end of line signal conducted on lines 40 and 41 operates a one-shot multivibrator 44 whose output on line 46 actuates an electromechanical indexer 48 which indexes the document transport 17 one line at a time. The result is that after each line of characters is scanned by head 11, the document is indexed to the next line of characters.

I shall now describe what happens when a single line of characters is scanned and all of the characters are identified by reading machine 10. The scan information is gathered by scan head 11 and conducted over the wires of cable 11*a* to the reading machine 10. In the normal operation of a conventional reading machine, coded outputs identifying the individual characters are conducted on the conductors of cable 14. In my arrangement the characters of a single line are stored in a shift register buffer 50 (or the equivalent). Buffer 50 is ample to store all of the characters expected in a single line. For instance, let us assume that the shift register buffer has 100 stages.

At the end of the line of characters, the signal on lines 40, 41 and 42 triggers counter 52 containing 100 stages, and the outputs of the counter are conducted on lines 54, 56 as shift pulses for the shift register buffer 50. Therefore, buffer 50 is unloaded serially, character by character, over line 58 to an inhibit gate 60 where the inhibit signal is ultimately derived from a reading machine reject signal. Since we assumed that there are no rejects in the line of characters being read, gate 60 passes the character identifying information over line 62 to the conventional paper tape punch 12, causing it to punch character-identifying codes in tape 18. The tape feed mechanism of punch 12 is advanced in time with the unloading of register 50 by timing signals from counter 52 which are conducted over line 54, through inhibit gate 88 and line 89. As described previously, tape 18 enters the tape buffer accumulator 24 as it is discharged from punch 12, while the document 16 enters the document buffer accumulator 26 as it is indexed by the document transport 17.

Now consider the case where one of the characters of a line on document 16 is rejected by the reading machine for any reason, e.g. the rejected character is poorly printed. Although a machine may have difficulty in determining the identity of a given character, a human being examining the character, especially in word context, will ordinarily have little or no difficulty in identifying the character.

As before, the character-information outputs of the reading machine on line 14 are gated into or otherwise applied to shift register 50. When a reject signal occurs on line 22, it sets flip flop 68 to provide a standing signal on line 70 which fires the one-shot multivibrator 72. The output line 74 of the multivibrator 72 triggers a code generator 76 whose output line 78 sets punch 12 so that a reject or ignore code is punched directly into tape 18 (see FIGURE 1*b*). Immediately thereafter the signal on line 74 is conducted through delay 80 to trigger counter 82 of 100+"*n*" stages. The output of the counter is conducted on line 84 to the advance mechanism of punch 12, thereby advancing tape 18 an amount corresponding to the capacity of shift register 50 plus an amount equal to "*n*" which will correspond to a space on the tape (FIGURE 1*b*) enabling the operator of device 28 to punch in any instructions or correct any errors that the operator may make when the operator manually punches in codes corresponding to the characters of the line on document 16, containing the reject.

When the end of the line of characters is signaled over lines 40 and 41 to index document transport 17, flip flop 68 is reset over line 43 through delay 47. The delay 47 is sufficiently long to enable counter 52 to cycle (by the "end of line" signal on line 42) and provide shift pulses to register 50 to clear the register. However, in clearing the register, the punch 12 is not advanced nor is any stored data in buffer 50 applied to punch 12, due to a signal from flip flop 68 over lines 70 and 71. Line 71 provides an inhibit signal for inhibit gate 88 interposed in lines 54 and 89 ahead of the advance mechanism of punch 12. Line 73 connected to line 71 and attached to the inhibit terminal of gate 60, inhibits this gate so that any information stored in buffer 50 cannot pass gate 60 to reach the punch 12.

I now have described how the reject code is applied to punch paper tape 18, and that the tape is stored in the buffer accumulator 24, while the document 16 is accumulated in buffer 26. As mentioned previously, the punched tape is fed to the punched paper tape reader 29 of device 28 to enable a human operator to type in code information corresponding to the line of characters of document 16 which has a rejected character. To make certain that the operator will know which line of print on document 16 contains the rejected character, the reject mark (shown as an asterisk in FIGURES 1 and 1*a*) is formed as an optical mark on document 16 in response to the reject signal from the reading machine. To do this, line 92 is connected to line 22 which conducts the reject signals, and the signal on line 92 is used to trigger a one-shot multivibrator 94. The output line 96 of the one-shot multivibrator operates a printer 98 mounted above document 16. The printer can be a solenoid whose armature contains a pen, pencil, scriber or the equivalent, so that every time the solenoid is pulsed, the scriber makes a mark on the document adjacent to the line being scanned by scan head 11. If it is desired to mark each character which is rejected, marker 98 can be attached to head 11. Where there is a large number of rejects, the printer 98 may be of the stepping type such as a commercially available stamp which prints successive number for each reciprocation. In this way the operator of device 28 will know that the rejects must be taken in a particular order to be coordinated with the tape 18.

It is understood that many alterations and modifications may be made without departing from the protection afforded by the following claims. For instance, I have discussed only punched paper tape, and my system can be used in forming other kinds of records, particularly magnetic as mentioned before. Further, various terms are used which may have limited meanings in certain fields. I use the term "document" to represent any surface on which characters are formed. The document need not be pin fed as I have illustrated, nor need it be in strip form. I have used the term "character" herein to mean any number, letter, symbol, pattern, or portion thereof capable of being recognized by machine.

I claim:

1. In a reading system having a reading machine for documents where the reading machine provides a reject signal upon failure to read a portion of the document, and where the machine marks the document to indicate the unread portion thereof, a document accumulator to buffer a part of the document, means fed from said accumulator to present the document for display, record-forming means operable to form a record of the information read from the document, means to code the record when said reject signal is provided by the reading machine, means responsive to the reject signal to advance the record in a manner to provide a blank space in the record adjacent to said code and means to examine said record and detect said code so that the corresponding marked portion of said document may be easily discovered and information corresponding to the unread portion of the document inserted in said blank space of the record.

2. In a reading system having a reading machine for documents where the reading machine provides a reject signal indicating a failure to read a portion of the document, and where the machine marks the document to indicate the unread portion thereof, record-forming means operable to form a record of the information read from the document, means to code the place on the record corresponding to the document being read when said reject signal is provided by the reading machine, said record forming means being responsive to said reject signal to advance the record a predetermined excess amount to furnish a blank space in the record for insertions and corrections, and buffers for said record and said document to accumulate the same to enable said document to be examined and said record completed while the reading machine continues to operate.

3. The system of claim 1 wherein said means to advance the record and provide a blank space in the record include a record buffer accumulator which enables the record forming means and said reading machine to operate asynchronously to the limit of the buffer accumulator capacity.

4. In a reading machine for continuously reading a document and providing outputs corresponding to the read data, said machine providing a reject signal when a portion of the data is not read by the machine, a document store to buffer a part of the document, record-forming means responsive to said outputs for forming a record of the read data, said record-forming means providing a reject code on the record in response to a said reject signal, means responsive to said reject signal for marking the document to facilitate location of the rejected data of the document, means to insert the rejected data at the reject-code part of said record, and buffer storage means for said document and said record so that said machine may continue to operate while said rejected data is inserted.

5. The subject matter of claim 4 wherein said record is advanced by said record-forming means a predetermined amount after said reject code is applied to said record to provide additional space on the record for editing the record.

6. The subject matter of claim 5 wherein said record is a punch paper tape.

7. In combination, a punch, a character reading machine for characters on a continuous document where the outputs of the machine are fed to said punch to punch a paper tape, said machine having means to provide a reject signal when the machine fails to identify a character, means responsive to said reject signal for marking said document and the corresponding part of said tape, recognizing means for the mark on said tape, manual means to insert data into said tape, means affording a visual examination of said document for the mark on the document so that upon recognition of a tape mark by said recognizing means the corresponding portion of said document may be visually examined and said manual means used to insert the reject character in said tape.

8. The combination of claim 7 and a buffer-accumulator for said tape and said document between said reading machine and said manual means to allow the tape and document to accumulate during manual insertion of data into the tape so that the reading machine may continue to operate without stopping.

9. A system to form a tape having data corresponding to the intelligence of a printed document, said system comprising a reading machine providing outputs corresponding to said intelligence and having means to produce a signal indicating a machine-rejection of a portion of said intelligence, means responsive to said signal for marking the printed document to indicate the part of the document having the rejected intelligence, means responsive ot the machine outputs to transduce said outputs to tape data, means responsive to said reject signal for providing a tape-identification of the part of the tape which should have said rejected portion of said intelligence, means for examining the formed tape for said tape identification, and means providing for visual inspection of said document corresponding to the identification on the tape so that the operator may manually insert the data in said part of the tape.

10. In a system to form a complete original tape directly from the output of a document reading machine where the output of the machine includes information signals and randomly occurring reject signals, a reading machine output buffer for the information signals, a tape punch fed by said output buffer to punch information codes in the tape, means responsive to a said reject signal to prevent information signals from reaching the punch from said buffer, means also responsive to the reject signal for punching a reject code in the tape, means responsive to the reject signal for thereafter advancing the tape to provide a blank space in the tape following the reject code, a tape processor having a tape feeder and means to insert information into the tape by punching the latter, means to recognize said reject code and stop the tape feeder thereby enabling said insert means to be actuated to punch information in the blank space of said tape, and a tape accumulator between said first mentioned tape punch and said tape processor for providing a quantity of buffered tape useful while said processor is being used to insert information into the tape without stopping the document reading machine.

References Cited by the Examiner

UNITED STATES PATENTS

| | | | |
|---|---|---|---|
| 2,937,368 | 5/1960 | Newby | 340—174.1 |
| 2,939,116 | 5/1960 | Burns | 340—172.5 |
| 3,020,525 | 2/1962 | Garrison | 340—172.5 |

ROBERT C. BAILEY, *Primary Examiner.*

MALCOLM A. MORRISON, *Examiner.*

G. D. SHAW, *Assistant Examiner.*